US008202168B2

(12) United States Patent
Adiraju et al.

(10) Patent No.: US 8,202,168 B2
(45) Date of Patent: Jun. 19, 2012

(54) SYSTEMS AND METHODS FOR MANAGING MEMORY IN WAGERING GAME MACHINES

(75) Inventors: Srinivyasa M. Adiraju, Vernon Hills, IL (US); Peter R. Anderson, Glenview, IL (US); Ryan S. Mak, Chicago, IL (US); Jim Motyl, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 570 days.

(21) Appl. No.: 12/305,517

(22) PCT Filed: Jun. 28, 2007

(86) PCT No.: PCT/US2007/015053

§ 371 (c)(1), (2), (4) Date: Dec. 18, 2008

(87) PCT Pub. No.: WO2008/005298

PCT Pub. Date: Jan. 10, 2008

(65) Prior Publication Data

US 2010/0029389 A1 Feb. 4, 2010

Related U.S. Application Data

(60) Provisional application No. 60/806,388, filed on Jun. 30, 2006, provisional application No. 60/851,965, filed on Oct. 16, 2006, provisional application No. 60/916,365, filed on May 7, 2007.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ............. 463/43; 463/16; 360/131; 711/170

(58) Field of Classification Search .................... 463/16, 463/43; 360/131; 365/94; 711/170
See application file for complete search history.

(56) References Cited

U.S. PATENT DOCUMENTS

| | | | |
|---|---|---|---|
| 5,109,360 | A | 4/1992 | Inazumi et al. |
| 5,560,003 | A | 9/1996 | Nilsen et al. |
| 5,581,736 | A | 12/1996 | Smith |
| 6,065,130 | A | 5/2000 | Glitho |
| 6,199,075 | B1 | 3/2001 | Ungar et al. |
| 6,295,594 | B1 | 9/2001 | Meier |
| 6,360,233 | B1 | 3/2002 | Houldsworth |
| 6,640,290 | B1 | 10/2003 | Forin et al. |
| 6,874,075 | B2 | 3/2005 | Jerding et al. |
| 6,941,437 | B2 | 9/2005 | Cook et al. |
| 7,111,141 | B2 | 9/2006 | Nelson |
| 7,133,994 | B2 | 11/2006 | Abbey |
| 2002/0059347 | A1 | 5/2002 | Shaffer et al. |
| 2004/0198494 | A1 | 10/2004 | Nguyen et al. |
| 2005/0164783 | A1 | 7/2005 | Paulsen et al. |
| 2005/0204235 | A1 | 9/2005 | Kretchmer et al. |
| 2005/0282603 | A1 | 12/2005 | Parrott et al. |
| 2006/0085787 | A1 | 4/2006 | Breslaw |

OTHER PUBLICATIONS

"International Application Serial No. PCT/US2008/15053, Search Report mailed Jun. 13, 2008", 4 pgs.
"International Application Serial No. PCT/US2008/15053, Written Opinion mailed Jun. 13, 2008", 5 pgs.

*Primary Examiner* — Fernando L Toledo

(74) *Attorney, Agent, or Firm* — Schwegman, Lundberg & Woessner, P.A.

(57) ABSTRACT

Systems and methods manage memory in a wagering game machine. The systems and methods determine one or more quantities of various types of memory that are required by a wagering game application. The systems and methods determine if the wagering game machine has enough available memory to perform a requested operation such as downloading the wagering game, activating a component of the wagering game, or installing content for the wagering game.

30 Claims, 6 Drawing Sheets

SYSTEMS AND METHODS FOR MANAGING MEMORY IN WAGERING GAME MACHINES

This patent application is a U.S. National Stage Filing under 35 U.S.C. 371 from International Patent Application Serial No. PCT/US2007/015053, filed Jun. 28, 2007, and published on Jan. 10, 2008, as WO 2008/005298 A2, which claims the priority benefit of U.S. Provisional Patent Application Ser. No. 60/806,388 filed Jun. 30, 2006 and entitled "SYSTEMS AND METHODS FOR MANAGING MEMORY IN WAGERING GAME MACHINES", and to U.S. Provisional Patent Application Ser. No. 60/851,965 filed Oct. 16, 2006 and entitled "SYSTEMS AND METHODS FOR MANAGING MEMORY IN WAGERING GAME MACHINES", and to U.S. Provisional Patent Application Ser. No. 60/916,365 filed May 7, 2007 and entitled "SYSTEMS AND METHODS FOR MANAGING MEMORY IN WAGERING GAME MACHINES", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game systems, and more particularly, to managing memory in wagering game machines and systems.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers frequently update wagering game content with new game themes, game settings, bonus events, game software, and other electronic data. New wagering game content may be downloaded to a wagering game machine or it may be resident on a storage device. As wagering game components are activated, they typically consume memory resources on the wagering game machine.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Figure 1:
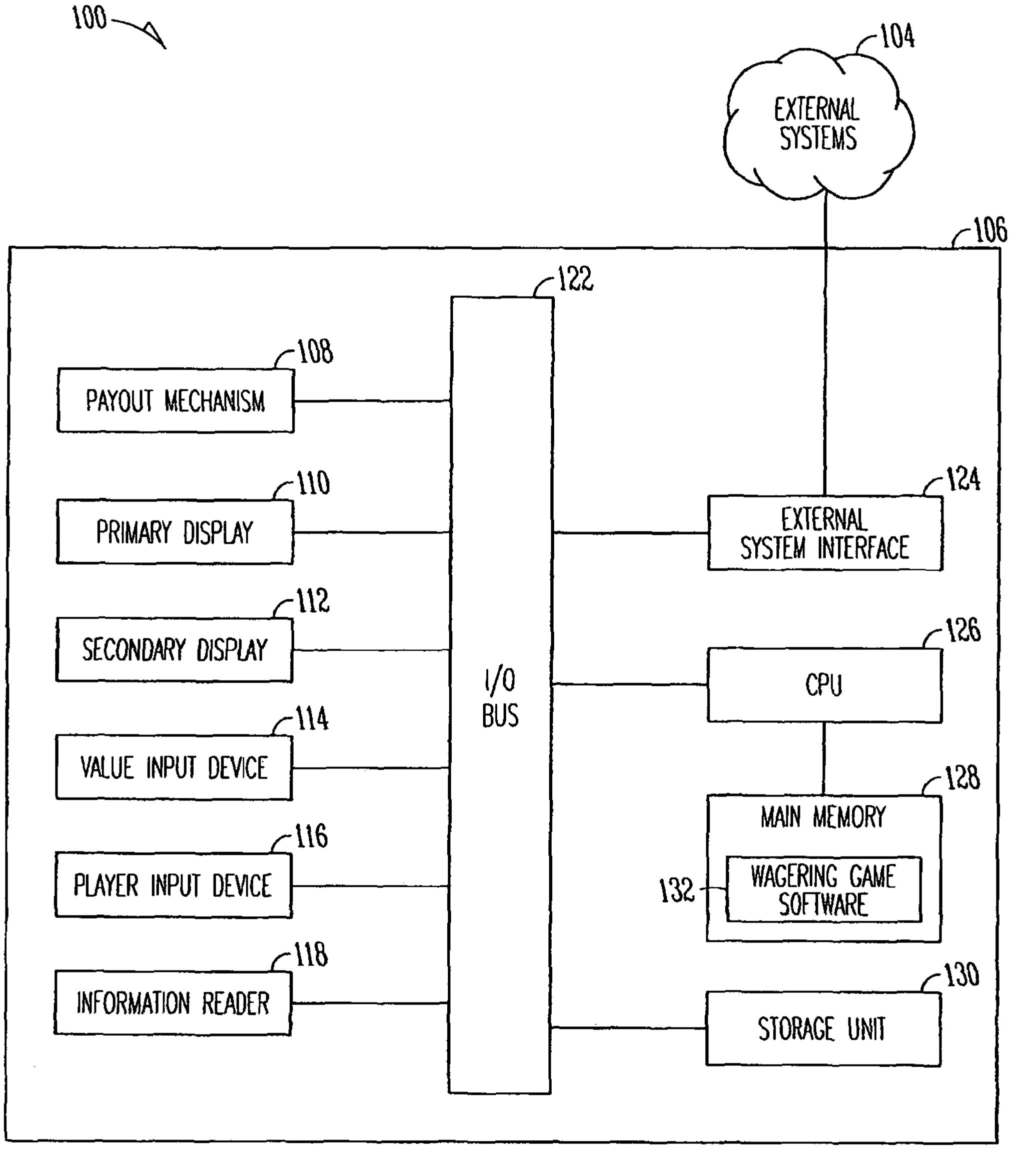
FIG. 1 is a block diagram illustrating a wagering game machine architecture, according to example embodiments of the invention.

FIG. 1 is a block diagram illustrating a wagering game machine architecture, including a control system, according to example embodiments of the invention. As shown in FIG. 1, the wagering game machine 106 includes a central processing unit (CPU) 126 connected to main memory 128, which may store wagering game software 132. In one embodiment, the wagering game software can include software associated with presenting wagering games, such as video poker, video blackjack, video slots, video lottery, etc., in whole or part. In addition, wagering game software 132 may include bonus rounds, themes, advertising content, attract mode content, pay tables, denomination tables, audio files, video files, operating system files and other software associated with a wagering game or the operation of a wagering game machine.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers. The I/O bus 122 is also connected to an external system interface 124, which is connected to external systems 104 (e.g., wagering game networks).

Figure 2:
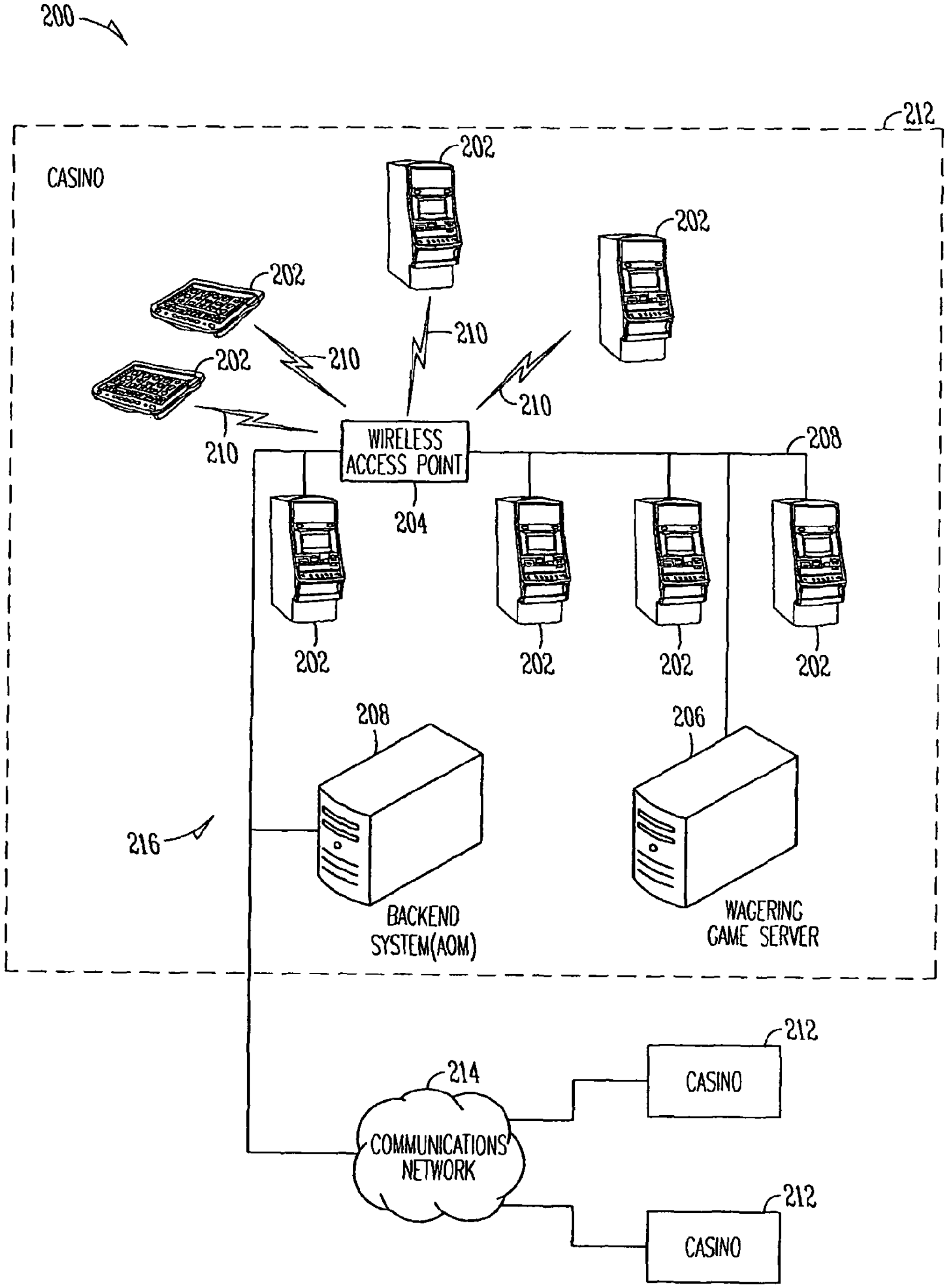
FIG. 2 is a block diagram illustrating a wagering game network, according to example embodiments of the invention.

Wagering game software 132 may be loaded from storage unit 130, or it may be loaded from external systems 104 such as servers of other systems on a wagering game network (illustrated further in FIG. 2).

As noted above, main memory 128 and storage unit 130 may be used to store control software, operational instructions and data associated with the wagering game machine. In some embodiments, main memory 128 or storage unit 130 may include read only memory (ROM), one or more banks of volatile or non-volatile memory, including RAM, NVRAM, compact flash, hard drives, CD-ROM drives, DVD-ROM drives and combinations thereof. Additionally, some or all of memory 128 or storage unite 130 may comprise MRAM (magnetoresistive or magnetic RAM). Generally speaking, MRAM is a non-volatile RAM memory technology that uses magnetic charges to store data instead of electric charges. In further alternative embodiments, NVRAM 44 and 46 may be FRAM (Ferromagnetic RAM). MRAM and FRAM may be desirable, because they do not require power in order for the memory to retain data. In still further embodiments, memory 128 or storage unit 130 may include optical memory (ORAM), also referred to as quantum optical memory. The use of optical memory may be desirable because it is generally more dense, thereby occupying less area on a system board for a wagering game machine. For example, an optical memory chip may have a much higher capacity when compared with flash memory, and a lower cost per gigabyte. Further, optical memory does not have a limited number of cycles to update information, thereby making the optical memory suitable as a RAM replacement or for long term storage. Additionally, optical memory may require less power to operate than other forms of memory. Further details on optical memory may be found in U.S. Pat. No. 5,841,689 entitled "Non-volatile record carrier with magnetic quantum-optical reading effect and method for its manufacture." In alternative embodiments, optical memory may be protein based, for example, using the photosensitive protein bacteriorhodopsin with a two-photon method of exciting the molecules. Bacteriorhodopsin is a light-harvesting protein from bacteria that live in salt marshes that has shown promise as a feasible optical data storage.

In one embodiment, the wagering game machine 106 can include additional peripheral devices and/or more than one of each component shown in FIG. 1. For example, the peripherals may include a bill validator, a printer, a coin hopper, a button panel, or any of the many peripherals now found in wagering game machines or developed in the future. Further, in some embodiments, the wagering game machine 106 can include multiple external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

The CPU and peripherals (e.g., buttons, printer, bill acceptor, coin acceptor, coin hopper, card reader, lights, reel mechanisms, video display(s), etc.) of the wagering game machine may communicate via a wired or wireless connection. Wireless communications between the CPU and peripherals may be implemented using proprietary or non-proprietary wireless communication protocols. Some examples of non-proprietary standard wireless communication protocols that can be used include Bluetooth™, IEEE 802.11a, IEEE 802.11b, IEEE 802.11x (e.g. other IEEE 802.11 standards), hiperlan/2, HomeRF, UWB (UltraWide Band), and the like.

While FIG. 1 describes example embodiments of a wagering game machine architecture, FIG. 2 shows how a plurality of wagering game machines can be connected in a wagering game network.

Example Wagering Game Network

FIG. 2 is a block diagram illustrating a wagering game network, according to example embodiments of the invention. As shown in FIG. 2, the wagering game network 200 includes a plurality of casinos 212 connected to a communications network 214.

Each of the plurality of casinos 212 includes a local area network 216, which includes a wireless access point 204, wagering game machines 202, and a wagering game server 206 that can serve wagering games over the local area network 216. As such, the local area network 216 includes wireless communication links 210 and wired communication links 208. The wired and wireless communication links can employ any suitable connection technology, such as Bluetooth, 802.11, Ethernet, public switched telephone networks, SONET, etc. In one embodiment, the wagering game server 206 can serve wagering games and/or distribute content to devices located in other casinos 212 or at other locations on the communications network 214.

The wagering game machines 202 and wagering game server 206 can include hardware and machine-readable media including instructions for performing the operations described herein.

The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc. In one embodiment, the wagering game network 200 can include other network devices, such as accounting servers, wide area progressive servers, player tracking servers, and/or other devices suitable for use in connection with embodiments of the invention.

Example Wireless Environment

In some embodiments, the wireless access point 204 and wagering game machines 202 can communicate orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access point 204 and wagering game machines 202 can communicate in accordance with a broadband multiple access technique, such as orthogonal frequency division multiple access (OFDMA). In some embodiments, the wireless access point 204 and wagering game machines 202 can communicate using spread-spectrum signals.

In some embodiments, the wireless access point 204 can be part of a communication station, such as wireless local area network (WLAN) communication station including a Wireless Fidelity (WiFi) communication station, or a WLAN access point (AP). In these embodiments, the wagering game machines 202 can be part of a mobile station, such as WLAN mobile station or a WiFi mobile station.

In some other embodiments, the wireless access point 204 can be part of a broadband wireless access (BWA) network communication station, such as a Worldwide Interoperability for Microwave Access (WiMax) communication station, as the wireless access point 204 can be part of almost any wireless communication device. In these embodiments, the wagering game machines 202 can be part of a BWA network communication station, such as a WiMax communication station.

In some embodiments, any of the wagering game machines 202 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the frequency spectrums for the communication signals transmitted and received by the wireless access point 204 and the wagering game machines 202 can comprise either a 5 gigahertz (GHz) frequency spectrum or a 2.4 GHz frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz, but other frequency spectrums are also equally suitable. In some BWA network embodiments, the frequency spectrum for the communication signals can comprise frequencies between 2 and 11 GHz.

In some embodiments, the wireless access point 204 and the wagering game machines 202 can communicate RF signals in accordance with specific communication standards, such as the Institute of Electrical and Electronics Engineers (IEEE) standards including IEEE 802.11(a), 802.11(b), 802.11(g), 802.11 (h) and/or 802.11 (n) standards and/or proposed specifications for wireless local area networks, but they can also be suitable to transmit and/or receive communications in accordance with other techniques and standards. In some BWA network embodiments, the wireless access point 204 and the wagering game machines 202 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 204 and the wagering game machines 202 can communicate in accordance with standards such as the Pan-European mobile system standard referred to as the Global System for Mobile Communications (GSM). In some embodiments, the wireless access point 204 and the wagering game machines 202 can also communicate in accordance with packet radio services such as the General Packet Radio Service (GPRS) packet data communication service. In some embodiments, the wireless access point 204 and the wagering game machines 202 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 204 and the wagering game machines 202 can provide packet data services (PDS) utilizing packet data protocols (PDP). In other embodiments, the wireless access point 204 and the wagering game machines 202 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 204 and the wagering game machines 202 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 204 and the wagering game machines 202 can communicate in accordance with an ultra-wideband (UWB) communication technique where a carrier frequency is not used. In other embodiments, the wireless access point 204 and the wagering game machines 202 can communicate in accordance with an analog communication technique. In other embodiments, the wireless access point 204 and the wagering game machines 202 can communicate in accordance with an optical communication technique, such as the Infrared Data Association (IrDA) standard. In some embodiments, the wireless access point 204 and the wagering game machines 202 can communicate in accordance with the Home-RF standard which can be in accordance with a Home-RF Working Group (HRFWG) standard.

Figure 3:
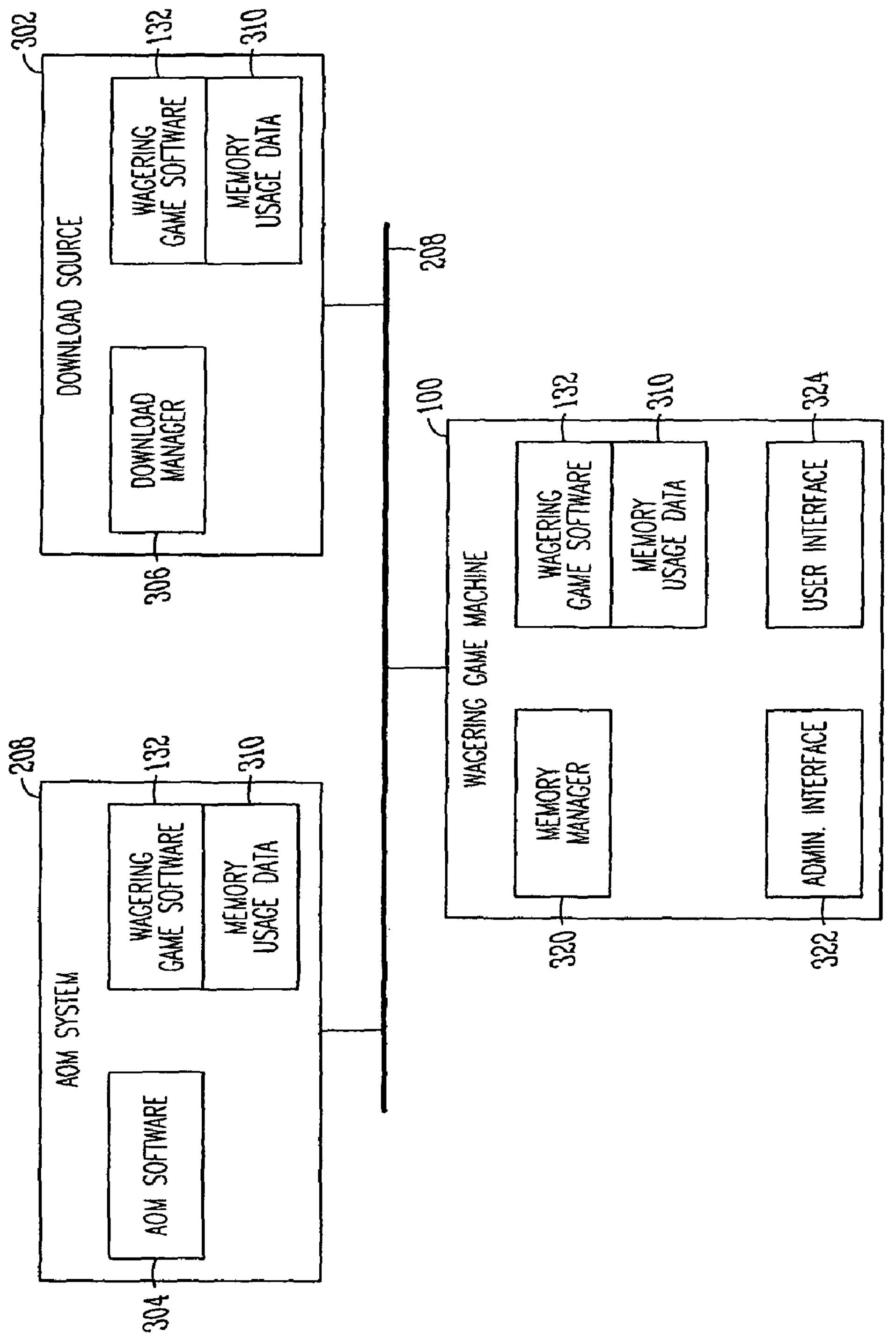
FIG. 3 is a block diagram providing further details of a wagering game architecture and network, according to example embodiments of the invention.

FIG. 3 is a block diagram providing further details of a wagering game system 300 and network, according to example embodiments of the invention. In some embodiments, system 300 includes an AOM (Administration, Operation and Maintenance) system 208 and a wagering game machine 100 communicably coupled via network 208. In further embodiments, system 300 may include a download source 302. AOM system 208 may include AOM software 304, wagering game software 132 and/or memory usage data 310. AOM software 304 provides an interface for sending and receiving commands and responses related to the administration, operation and/or maintenance of systems on a wagering game machine network. The systems may be wagering game machines 100 or other servers or devices on the wagering game machine network. In some embodiments, AOM system 208 may issues requests to enable some or all of the components of wagering game software 132 to be executed on a wagering game machine 100.

Memory usage data 310 may be associated with the wagering game software 132. In some embodiments, memory usage data may include one or more of the following items:

Hard drive space required

NVRAM space required for activation or a component or components of the software 132

RAM required for activation

Peak RAM usage while a game is active or being played

It should be noted that the items described above may be broken down into individualized components or units of the software 132. For example, NVRAM space may be provided for a number of different pay tables that may be activated. Further, the RAM space required for activation may include RAM required while a game is enabled, but not currently being played. For example, the game may be available as part of a multiple game menu in which a player may select one of the available games. The available games may use a first amount of RAM while enabled but idle, and a second amount of RAM while the game is being played.

Memory usage data 310 may be determined in any of a number of ways in varying embodiments of the invention. In some embodiments, memory usage data 310 may be determined based on analysis of a component after it has been compiled into an object format. For example, static data sizes and code sizes for an executable and file sizes may be determined using this method. In alternative embodiments, software tools may be used that analyze the memory usage requirements of a wagering game as it is being executed. Such tools may be useful in determining the dynamic and/or peak memory requirements of the software as it is being executed. In further alternative embodiments, estimates of size requirements may be provided by the developer(s) of the wagering game software.

In some embodiments, memory usage data 310 may be a portion of data included with the wagering game software. For example, memory usage data 310 may be included in a file that is provided as part of the wagering game software 132. However, in alternative embodiments, memory usage data 310 may be maintained in a database. The database may be a relational database, a flat file database, or any other mechanism usable to store memory usage requirements for wagering game software 132.

In some embodiments, AOM system 208 may store wagering game software 132 and memory usage data 310. In alternative embodiments, a download source may store wagering game software 132 and/or memory usage data 310. In these embodiments, AOM system 208 may request that the wagering game software be downloaded or enabled on a wagering game machine 100. If the requested software or software component is not currently resident on the wagering game machine 100, it may be downloaded from the download source 302. The wagering game machine 100 may determine that sufficient memory resources exist prior to initiating the download using memory usage data 310.

In some embodiments, wagering game machine 100 includes a memory manager 320, and may also include an administrative interface 322 and/or a user interface 324. Memory manager 320 determines current memory availability and determines, based on memory usage data 310 whether a wagering game software component 132 may be enabled, activated, and/or downloaded on a wagering game machine 100. In some embodiments, memory manager 320 may make the determination in response to a request received from an AOM system 208. In alternative embodiments, memory manager 320 may make the determination in response to a command input via administrative interface 322. Administrative interface 322 provides a mechanism for a technician to enable/disable wagering game software components on the wagering game machine itself. This may be useful in environments where the wagering game machine 100 is a standalone system that is not coupled to a network, or does not receive software or commands over a network.

Alternatively, wagering game software may be enabled via user interface 324. For example, user interface 324 may provide a menu of wagering game software options to a player. The player may select via the menu which wagering game or wagering game options to execute. Memory manager 320, in response to the user's request, may determine whether there are enough memory resources on the machine to execute the player's requested game or option. Alternatively, the menu of options provided to the user may be determined based on whether there are enough memory resources to execute the wagering game software or component. For example, in some embodiments (either downloadable or standalone), a wagering game machine (202 or 204) only displays to a player a particular game (in a menu) as available for download so that it can be played if the network has sufficient bandwidth to actually download to the wagering game machine. Thus, for example, an "on-demand" game menu or other type of list of available games only displays those games that the network is, in fact, capable of downloading to the gaming machine.

Further, in some embodiments, a visual indicator on the front screen of a gaming machine indicates to players that there is new content available on the server-based gaming network. Drawing attention to such new software may result in increased play of the machine.

Download source 302 may be a download server operable to store a variety of wagering game software 132 and/or software components. Alternatively, download source 302 may be another wagering game machine 100 in environments supporting a peer-to-peer model of software downloading. Download source 302 may include a download manager 306 that implements a download protocol appropriate to the type of software distribution method in use (e.g. client/server, peer-to-peer, multiple-tier based system, middleware etc.)

FIG. 3 has provided details regarding various systems used to enable and download wagering game software components. Further details on the operation of the above-described systems are provided below with reference to FIGS. 4A and 4B.

Figure 4A:
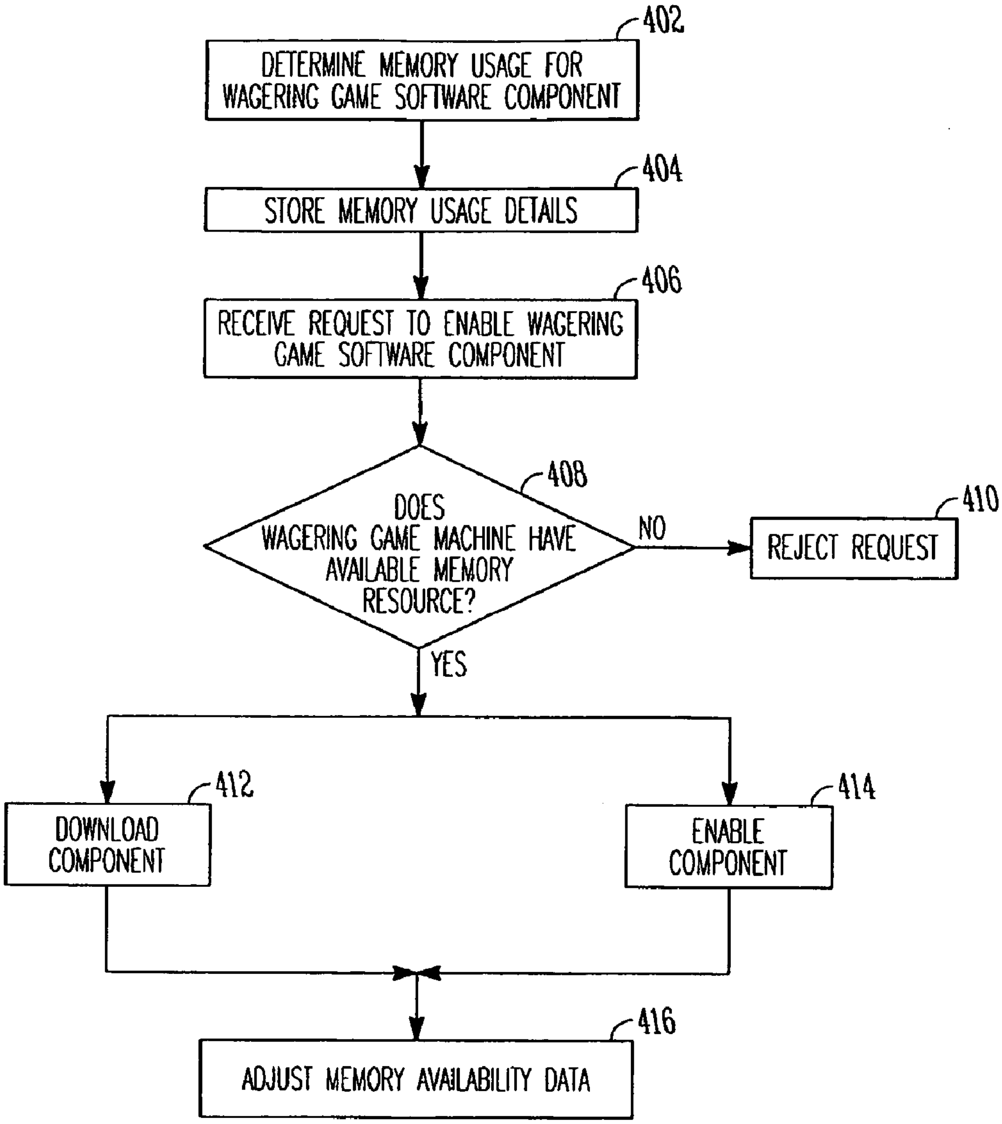
FIGS. 4A and 4B are flowcharts illustrating methods, according to example embodiments of the invention.
Figure 4B:
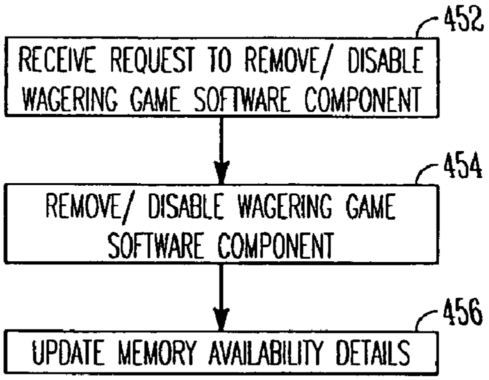

FIGS. 4A and 4B are flowcharts illustrating methods for enabling and/or downloading wagering game software that utilize memory usage data, according to example embodiments of the invention. FIG. 4A illustrates a method for utilizing memory usage requirements when enabling wagering game software on a wagering game machine 100. The method begins at block 402, by determining memory usage for a wagering game software component or package. As noted above, various methods may be used to determine the memory requirements, including file storage requirements, static, dynamic, and/or peak runtime memory requirements, and requirements for components such as pay tables, denomination data, themes, bonus rounds, episodes, audio/video content, or other components of a wagering game.

At block 404, the memory usage requirements determined at block 402 may be stored. As discussed above, the memory usage requirements may be stored in a file that is distributed with the wagering game software. Alternatively, the memory usage requirements may be maintained in a database or bill of materials system.

At block 406, a request to enable one or more components of a wagering game is received. In some embodiments, the request may be generated on an AOM system. In alternative embodiments, the request may be generated on an interface such as a user interface or an administrative interface. It should be noted that blocks 402 and 404 may be executed on a system or systems that are different from the wagering game machine that receives the request at block 406, and may be executed at an earlier time than block 406.

At block 408, a system executing the method determines if there are enough memory resources available to enable, execute, or download the wagering game software or software component. The determination at block 408 may be made in a number of ways. For example, in some embodiments, the AOM system 208 may query the wagering game machine to determine if enough memory is available prior to enabling or downloading software to the wagering game machine. In alternative embodiments, a wagering game machine 100 may receive a request to enable, execute or download wagering game software or software components. The wagering game machine may then determine if enough memory resources are available.

At block 410, if the check at block 408 determines that there are not enough available memory resources, then the request may be rejected. In some embodiments, the AOM system may reject the request. In alternative embodiments, a wagering game machine 100 may reject the request and send a message back to an AOM system issuing the request to indicate that the request was rejected and the reason the request was rejected. In further alternative embodiments, a message may be displayed on the wagering game machine indicating the request was rejected. In these embodiments, the message may be displayed via administrative interface 322 or user interface 324.

At block 412, if there are sufficient memory resources available, a system executing them method may download wagering game software or software components to a wagering game machine. Additionally, the software or software components may be enabled at block 414. In some embodiments, downloading may not be required if the software or software components are already resident on the wagering game machine. For example, enablement of a pay table that is already resident on a storage device such as a hard drive or compact flash on the wagering game machine may not require a download of the pay table. The new pay table may be installed in NVRAM from the storage device.

At block 416, the current memory availability on the wagering game machine may be updated to reflect the memory usage of the download and/or enabled wagering game software or software components.

FIG. 4B illustrates a method for adjusting memory availability when disabling wagering game software on a wagering game machine 100. The method begins at block 452 by receiving a request to remove or disable wagering game software or a wagering game software component. Like the request to enable, the request to remove or disable may be generated on an AOM system, or it may be generated via an administrative interface or a user interface.

At block 454, the wagering game software component is disabled or removed. In some embodiments, disabling a component may result in the component being removed from an NVRAM, but the component may be still available for re-enablement on a another storage device such as a hard drive or a compact flash. In this case, memory availability for the NVRAM may be adjusted upward, while storage unit availability may remain unchanged. Alternatively, the request may result in the component or wagering game software being removed from the storage device. In this case, memory availability for both NVRAM and the storage device may be adjusted. At block 456, memory availability data is updated to reflect the disabling and/or removal of the wagering game software or component.

Example Wagering Game Machine

Figure 5:
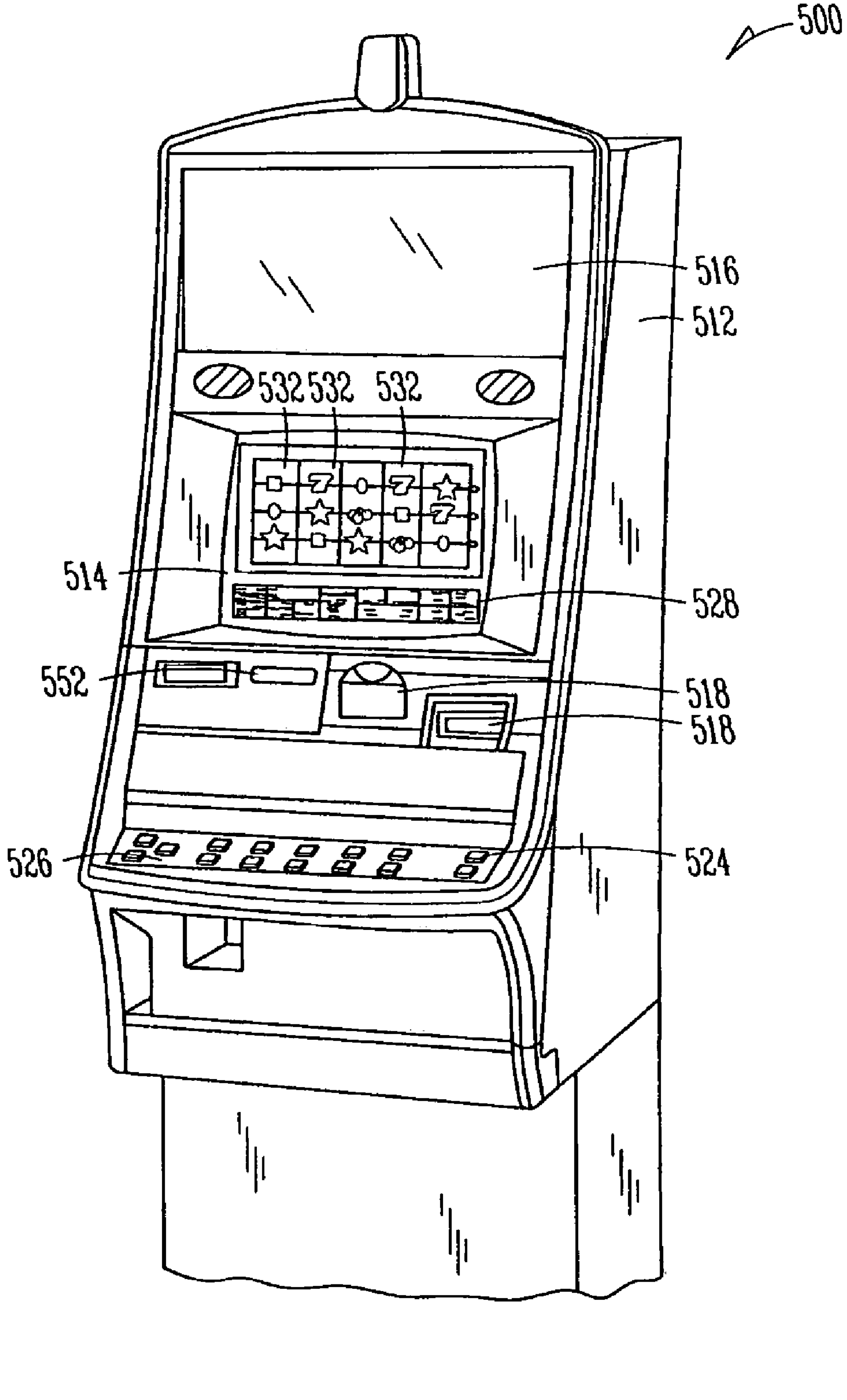
FIG. 5 shows an example embodiment of a wagering game machine.

FIG. 5 is a perspective view of a wagering game machine, according to example embodiments of the invention. Referring to FIG. 5, a wagering game machine 500 is used in gaming establishments, such as casinos. According to embodiments, the wagering game machine 500 can be any type of wagering game machine and can have varying structures and methods of operation. For example, the wagering game machine 500 can be an electromechanical wagering game machine configured to play mechanical slots, or it can be an electronic wagering game machine configured to play video casino games, such as blackjack, slots, keno, poker, blackjack, roulette, etc.

The wagering game machine 500 comprises a housing 512 and includes input devices, including value input devices 518 and a player input device 524. For output, the wagering game machine 500 includes a primary display 514 for displaying information about a basic wagering game. The primary display 514 can also display information about a bonus wagering game and a progressive wagering game. The wagering game machine 500 also includes a secondary display 516 for displaying wagering game events, wagering game outcomes, and/or signage information. While some components of the wagering game machine 500 are described herein, numerous other elements can exist and can be used in any number or combination to create varying forms of the wagering game machine 500.

The value input devices 518 can take any suitable form and can be located on the front of the housing 512. The value input devices 518 can receive currency and/or credits inserted by a player. The value input devices 518 can include coin acceptors for receiving coin currency and bill acceptors for receiving paper currency. Furthermore, the value input devices 518 can include ticket readers or barcode scanners for reading information stored on vouchers, cards, or other tangible portable storage devices. The vouchers or cards can authorize access to central accounts, which can transfer money to the wagering game machine 500.

The player input device 524 comprises a plurality of push buttons on a button panel 526 for operating the wagering game machine 500. In addition, or alternatively, the player input device 524 can comprise a touch screen 528 mounted over the primary display 514 and/or secondary display 516.

The various components of the wagering game machine 500 can be connected directly to, or contained within, the housing 512. Alternatively, some of the wagering game machine's components can be located outside of the housing 512, while being communicatively coupled with the wagering game machine 500 using any suitable wired or wireless communication technology.

The operation of the basic wagering game can be displayed to the player on the primary display 514. The primary display 514 can also display a bonus game associated with the basic wagering game. The primary display 514 can include a cathode ray tube (CRT), a high resolution liquid crystal display (LCD), a plasma display, light emitting diodes (LEDs), or any other type of display suitable for use in the wagering game machine 500. Alternatively, the primary display 514 can include a number of mechanical reels to display the outcome. In FIG. 5, the wagering game machine 500 is an "upright" version in which the primary display 514 is oriented vertically relative to the player. Alternatively, the wagering game machine can be a "slant-top" version in which the primary display 514 is slanted at about a thirty-degree angle toward the player of the wagering game machine 500. In yet another embodiment, the wagering game machine 500 can exhibit any suitable form factor, such as a free standing model, bartop model, mobile handheld model, or workstation console model.

A player begins playing a basic wagering game by making a wager via the value input device 518. The player can initiate play by using the player input device's buttons or touch screen 528. The basic game can include arranging a plurality of symbols along a payline 532, which indicates one or more outcomes of the basic game. Such outcomes can be randomly selected in response to player input. At least one of the outcomes, which can include any variation or combination of symbols, can trigger a bonus game.

In some embodiments, the wagering game machine 500 can also include an information reader 552, which can include a card reader, ticket reader, bar code scanner, RFID transceiver, or computer readable storage medium interface. In some embodiments, the information reader 552 can be used to award complimentary services, restore game assets, track player habits, etc.

Example Wagering Game Machine

Figure 6:
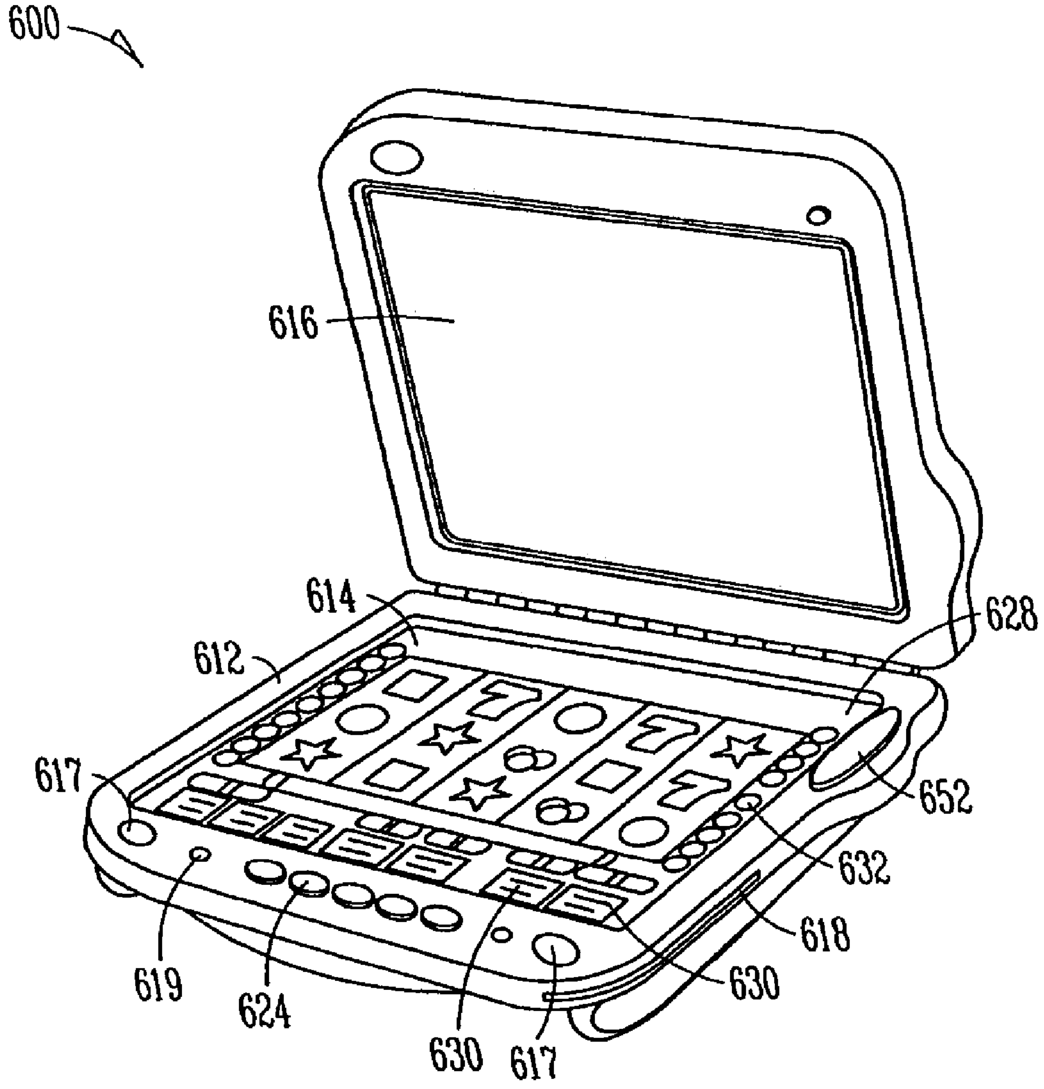
FIG. 6 shows an example embodiment of a portable wagering game machine

FIG. 6 shows an example embodiment of a wagering game machine 610. Like free standing wagering game machines, in a handheld or mobile form, the wagering game machine 610 can include any suitable electronic device configured to play a video casino games such as blackjack, slots, keno, poker, blackjack, and roulette. The wagering game machine 610 comprises a housing 612 and includes input devices, including a value input device 618 and a player input device 624. For output, the wagering game machine 610 includes a primary display 614, a secondary display 616, one or more speakers 617, one or more player-accessible ports 619 (e.g., an audio output jack for headphones, a video headset jack, etc.), and other conventional I/O devices and ports, which may or may not be player-accessible. In the embodiment depicted in FIG.

6, the wagering game machine 610 comprises a secondary display 616 that is rotatable relative to the primary display 614. The optional secondary display 616 can be fixed, movable, and/or detachable/attachable relative to the primary display 614. Either the primary display 614 and/or secondary display 616 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 618 can comprise, for example, a slot located on the front, side, or top of the casing 612 configured to receive credit from a stored-value card (e.g., casino card, smart card, debit card, credit card, etc.) inserted by a player. The player-accessible value input device 618 can also comprise a sensor (e.g., an RF sensor) configured to sense a signal (e.g., an RF signal) output by a transmitter (e.g., an RF transmitter) carried by a player. The player-accessible value input device 618 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 610.

Still other player-accessible value input devices 618 can require the use of touch keys 630 on the touch-screen display (e.g., primary display 614 and/or secondary display 616) or player input devices 624. Upon entry of player identification information and, preferably, secondary authorization information (e.g., a password, PIN number, stored value card number, predefined key sequences, etc.), the player can be permitted to access a player's account. As one potential optional security feature, the wagering game machine 610 can be configured to permit a player to only access an account the player has specifically set up for the wagering game machine 610. Other conventional security features can also be utilized to, for example, prevent unauthorized access to a player's account, to minimize an impact of any unauthorized access to a player's account, or to prevent unauthorized access to any personal information or funds temporarily stored on the wagering game machine 610.

The player-accessible value input device 618 can itself comprise or utilize a biometric player information reader which permits the player to access available funds on a player's account, either alone or in combination with another of the aforementioned player-accessible value input devices 618. In an embodiment wherein the player-accessible value input device 618 comprises a biometric player information reader, transactions such as an input of value to the wagering game machine 610, a transfer of value from one player account or source to an account associated with the wagering game machine 610, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 618 comprising a biometric player information reader can require a confirmatory entry from another biometric player information reader 652, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any finds. In another aspect, the value input device 618 can be provided remotely from the wagering game machine 610.

The player input device 624 comprises a plurality of push buttons on a button panel for operating the wagering game machine 610. In addition, or alternatively, the player input device 624 can comprise a touch screen mounted to a primary display 614 and/or secondary display 616. In one aspect, the touch screen is matched to a display screen having one or more selectable touch keys 630 selectable by a user's touching of the associated area of the screen using a finger or a tool, such as a stylus pointer. A player enables a desired function either by touching the touch screen at an appropriate touch key 630 or by pressing an appropriate push button on the button panel. The touch keys 630 can be used to implement the same functions as push buttons. Alternatively, the push buttons 626 can provide inputs for one aspect of the operating the game, while the touch keys 630 can allow for input needed for another aspect of the game. The various components of the wagering game machine 610 can be connected directly to, or contained within, the casing 612, as seen in FIG. 6, or can be located outside the casing 612 and connected to the casing 612 via a variety of wired (tethered) or wireless connection methods. Thus, the wagering game machine 610 can comprise a single unit or a plurality of interconnected (e.g., wireless connections) parts which can be arranged to suit a player's preferences.

The operation of the basic wagering game on the wagering game machine 610 is displayed to the player on the primary display 614. The primary display 614 can also display the bonus game associated with the basic wagering game. The primary display 614 preferably takes the form of a high resolution LCD, a plasma display, an LED, or any other type of display suitable for use in the wagering game machine 610. The size of the primary display 614 can vary from, for example, about a 2-3" display to a 15" or 17" display. In at least some embodiments, the primary display 614 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 614 and/or secondary display 616 can have a 16:9 aspect ratio or other aspect ratio (e.g., 4:3). The primary display 614 and/or secondary display 616 can also each have different resolutions, different color schemes, and different aspect ratios.

As with the free standing embodiments a wagering gaming machine, a player begins play of the basic wagering game on the wagering game machine 610 by making a wager (e.g., via the value input device 618 or an assignment of credits stored on the handheld gaming machine via the touch screen keys 630, player input device 624, or buttons 626) on the wagering game machine 610. In some embodiments, the basic game can comprise a plurality of symbols arranged in an array, and includes at least one payline 632 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 618 of the wagering game machine 610 can double as a player information reader 652 that allows for identification of a player by reading a card with information indicating the player's identity (e.g., reading a player's credit card, player ID card, smart card, etc.). The player information reader 652 can alternatively or also comprise a bar code scanner, RFID transceiver or computer readable storage medium interface. In one embodiment, the player information reader 652 comprises a biometric sensing device.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A method comprising:

determining, by a processor-based device, a memory usage amount for a wagering game software component, wherein the determining is performed prior to enabling the wagering game software component;

determining, by the processor-based device, an available memory amount on a wagering game machine for the software component based on the memory usage amount; and enabling, by the processor-based device, the wagering game software component if the available memory amount on the wagering game machine is sufficient based on the memory usage amount, wherein enabling the wagering game software component makes the wagering game software component available for selection by a user of the wagering game machine for execution on the wagering game machine.

2. The method of claim 1, wherein determining a memory usage amount includes receiving a predetermined calculation of the memory usage amount.

3. The method of claim 1, wherein the memory includes one or more of an NVRAM (Non-Volatile Random Access Memory), flash memory, RAM, optical RAM or hard drive.

4. The method of claim 1, wherein the wagering game software component includes one or more of a wagering game application, a pay table, wagering game content, denomination data, language data, theme data or configuration data.

5. The method of claim 1, wherein enabling the wagering game software component includes downloading the wagering game software component to the wagering game machine.

6. The method of claim 1, wherein enabling the wagering game software component includes activating the wagering game component after the wagering game component has been downloaded to the wagering game machine.

7. The method of claim 1, further comprising adjusting the available memory amount following the removal of a second wagering game software component.

8. A system comprising:

a wagering game machine having at least one memory, the memory to store a wagering game software component, the wagering game software component having a memory usage amount, and the wagering game machine operable to maintain an available memory amount for the at least one memory; and a server operable to issue a request to enable the wagering game software component on the wagering game machine;

wherein the wagering game machine is operable to enable the wagering game software component if the available memory amount is sufficient based on the memory usage amount, wherein enabling the wagering game software component makes the wagering game software component available for selection by a user of the wagering game machine for execution on the wagering game machine.

9. The system of claim 8, wherein the request includes the memory usage amount.

10. The system of claim 8, further comprising a download system operable to provide the wagering game software component to the wagering game machine if the available memory amount is sufficient based on the memory usage amount.

11. The system of claim 8, wherein the memory includes one or more of an NVRAM (Non-Volatile Random Access Memory), flash memory, RAM, optical RAM or hard drive.

12. The system of claim 8, wherein wagering game software component includes one or more of a wagering game application, a pay table, wagering game content, denomination data, language data, theme data or configuration data.

13. An apparatus comprising:

at least one processor and at least one memory, the at least one processor operable to present a wagering game and to maintain an available memory amount for the at least one memory; and an interface executable by the processor and operable to present an interface to enable or disable a wagering game software component, the wagering game software component having an associated memory usage amount, the memory usage amount determined prior to enabling the wagering game software component;

wherein the interface is operable to enable the wagering game software component if the available memory amount is sufficient based on the memory usage amount, wherein enabling the wagering game software component makes the wagering game software component available for selection by a user of the wagering game machine for execution on the wagering game machine.

14. The apparatus of claim 13 wherein the interface is further operable to request a download of the wagering game software component if the available memory amount is sufficient based on the memory usage amount.

15. The apparatus of claim 13, wherein the memory includes one or more of an NVRAM (Non-Volatile Random Access Memory), flash memory, RAM, optical RAM or hard drive.

16. The apparatus of claim 13, wherein wagering game software component includes one or more of a wagering game application, a pay table, wagering game content, denomination data, language data, theme data or configuration data.

17. The apparatus of claim 13, wherein the interface is a user interface for use by a wagering game player.

18. The apparatus of claim 13, wherein the interface is an administrative interface.

19. A non-transitory computer-readable medium having computer executable instructions for causing at least one processor to perform a method, the method comprising:

determining a memory usage amount for a wagering game software component;

determining an available memory amount on a wagering game machine for the software component based on the memory usage amount, the memory usage amount determined prior to enabling the wagering game software component; and enabling the wagering game software component if the available memory amount on the wagering game machine is sufficient based on the memory usage amount, wherein enabling the wagering game software component makes the wagering game software component available for selection by a user of the wagering game machine for execution on the wagering game machine.

20. The computer-readable medium of claim 19, wherein determining a memory usage amount includes receiving a predetermined calculation of the memory usage amount.

21. The computer-readable medium of claim 19, wherein the wagering game software component includes one or more of a wagering game application, a pay table, wagering game content, denomination data, language data, theme data or configuration data.

22. The computer-readable medium of claim 19, wherein enabling the wagering game software component includes downloading the wagering game software component to the wagering game machine.

23. The computer-readable medium of claim 19, wherein enabling the wagering game software component includes activating the wagering game component after the wagering game component has been downloaded to the wagering game machine.

24. The computer-readable medium of claim 19, further comprising adjusting the available memory amount following the removal of a second wagering game software component.

25. The method of claim 1, wherein determining the memory usage amount for the wagering game software component comprises obtaining the memory usage amount from a file that is provided with the wagering game software component.

26. The method of claim 1, wherein determining the memory usage amount for the wagering game software component comprises accessing a database to obtain the memory usage amount.

27. The apparatus of claim 13, wherein to determine the memory usage amount for the wagering game software component, the apparatus obtains the memory usage amount from a file that is provided with the wagering game software component.

28. The apparatus of claim 13, wherein to determine the memory usage amount for the wagering game software component, the apparatus obtains accesses a database to obtain the memory usage amount.

29. The computer-readable medium of claim 19, wherein determining the memory usage amount for the wagering game software component comprises obtaining the memory usage amount from a file that is provided with the wagering game software component.

30. The computer-readable medium of claim 19, wherein determining the memory usage amount for the wagering game software component comprises accessing a database to obtain the memory usage amount.

* * * * *

UNITED STATES PATENT AND TRADEMARK OFFICE

CERTIFICATE OF CORRECTION

PATENT NO. : 8,202,168 B2 
APPLICATION NO. : 12/305517
DATED : June 19, 2012
INVENTOR(S) : Adiraju et al.

It is certified that error appears in the above-identified patent and that said Letters Patent is hereby corrected as shown below:

In column 2, line 9, after "machine", insert --.--, therefor

In column 2, line 23, delete "blackjack", and insert --black jack--, therefor

In column 2, line 52, delete "unite", and insert --unit--, therefor

In column 12, line 8, delete "finds", and insert --funds--, therefor

Signed and Sealed this
Fourth Day of December, 2012

David J. Kappos

David J. Kappos
*Director of the United States Patent and Trademark Office*